United States Patent [19]
Stuebinger et al.

[11] 3,723,536
[45] Mar. 27, 1973

[54] PRODUCTION OF TRIARYL PHOSPHINES

[75] Inventors: Adolf Stuebinger; Herbert Mueller, both of Frankenthal, Germany

[73] Assignee: Badische Anilin- & Soda-Fabrik Aktiengesellschaft, Ludwigshafen, Rhine, Land Rhineland-Pfalz, Germany

[22] Filed: Feb. 9, 1971

[21] Appl. No.: 114,063

[30] Foreign Application Priority Data

Feb. 19, 1970 Germany.................P 20 07 535.8

[52] U.S. Cl............................................260/606.5 P
[51] Int. Cl.................................................C07f 7/02
[58] Field of Search..............................260/606.5 P

[56] References Cited

OTHER PUBLICATIONS

Houben–Weyl, "Methoden der Organ. Chemie," 4th edition, Vol. 12/1 (1963), pages 42–43.

*Primary Examiner*—Daniel E. Wyman
*Assistant Examiner*—Werten F. W. Bellamy
*Attorney*—Johnston, Root, O'Keeffe, Keil, Thompson & Shurtleff

[57] ABSTRACT

The production of triaryl phosphines from phosphorus halides and aryl halides in the presence of alkali metals in a Wurtz-Fittig type reaction. In order to carry out this reaction without risk, a dispersion of an alkali metal in an organic solvent is used which has been prepared with the addition of an aryl halide or a triaryl phosphine.

10 Claims, No Drawings

PRODUCTION OF TRIARYL PHOSPHINES

The synthesis of triaryl phosphines by reaction of an aryl halide with PCl₃ and an alkali metal has the advantage over other syntheses of being a simple method and using inexpensive starting materials (cf. Houben-Weyl, "Methoden der Organ. Chemie," 4th edition, volume 12/1 (1963), pages 42 and 43). The small yields, the formation of large amounts of malodorous byproducts and the lack of controllability are however disadvantages which militate against adoption of the reaction in industry. The reaction is difficult to initiate but then proceeds with great violence.

It is known from German Pat. No. 508,667 that finely divided alkali metal may be used to obtain better yields in the said reaction. At the same time it is recommended that catalysts such as iodobenzene, ethyl iodide or AlCl₃ should be used in order to make quite sure that initiation of the reaction will take place after some time.

It is further recommended in German Printed Application (DAS) 1,150,981 that the said reaction be carried out in the presence of a dialkyl ether having six to twelve carbon atoms in the molecule as an organic solvent to improve the yield. Triphenyl phosphine for example is obtained in a yield of only 73 percent by this method and there is no teaching as to how a safe course of the reaction can be ensured.

UK Pat. No. 1,128,896 discloses that Wurtz-Fittig reactions can be used for the synthesis of polymeric molecules, specifically plurally halogenated hydrocarbons being reacted with methallic sodium. This reaction is carried out in the presence of catalysts which function as sodium transferrers. Catalysts specified are readily enolizable compounds such as acetoacetic esters or malonic esters or compounds having reactive hydrogen atoms such as pyrrole, cyclopentadiene, phthalimide or compounds having reactive halogen atoms such as compounds containing iodine. These catalysts should have a different constitution from the starting materials chosen for the reaction and from the reaction products. Although the reaction is easier to control when these catalysts are used, the end products have to be purified more than once and consequently the yields are usually only from 40 to 65 percent.

Thus the cited prior art does not disclose any teaching for the manufacture of a triaryl phosphine under the conditions of an industrial synthesis in a satisfactory, safe and controllable manner in yields of more than 90 percent and the purity required for processin into pharmaceuticals.

We have now found that an aryl halide can be reacted with a phosphorus halide to form a triaryl phosphine on an industrial scale completely satisfactorily in the presence of an alkali metal dispersed in an organic solvent at a temperature within the range from 30° to 85°C and very pure triaryl phosphine can be obtained in a very good yield by using an alkali metal dispersion which has been prepared by dispersing alkali metal in the liquid condition in the organic solvent in the presence of from 0.005 to 10 percent by weight (based on the organic solvent) of a triaryl phosphine whose aryl radical is identical with that of the aryl halide used for the reaction and/or in the presence of from 0.005 to 5 percent by weight (based on the organic solvent) of the aryl halide used for the reaction.

Aryl monohalides are particularly suitable starting materials for the reaction. Aryl chlorides and aryl bromides are generally used, the aryl chlorides being preferred. It is preferred to use compounds of the benzene or naphthalene series. Substituents which are inert under the reaction conditions such as alkyl or alkoxy groups having one to four carbon atoms or aromatic hydrocarbons or aryloxy radicals having six to twelve carbon atoms may be attached to the aromatic nucleus. Examples are: chlorobenzene, bromobenzene, chlorotoluenes, chloroxylenes, α-bromonaphthalene, chlorodiphenyls, chloroanisoles and chlorodiphenyl ether.

Phosphorus trichloride is preferred as the phosphorus trihalide. Phosphorus tribromide and triiodide are however also suitable.

Examples of suitable alkali metals for the reaction are lithium, potassium, sodium and their compounds with one another.

The alkali metal is generally used in the process according to the invention in a particle size of from 0.01 to 5 mm. The preparation of this finely divided metal may be carried out by a conventional method, for example in a disperser with an organic solvent.

It is essential for the process according to this invention that the dispersion of the alkali metal be carried out in the presence of a triaryl phosphine and/or aryl halide which has been added to the organic solvent to be used for the preparation of the dispersion. The aryl radical of the additive is preferably identical with that of the aryl halide used for the reaction.

The triaryl phosphine is generally added in an amount of from 0.005 to 10 percent by weight, based on the organic solvent; larger amounts may be used but this increases the reaction speed considerably and moreover results in undesired byproducts. For these reasons it is preferred to use from 0.05 to 1.0 percent by weight of triaryl phosphine, based on the organic solvent.

Instead of, or additionally to, the triaryl phosphine, an aryl halide may be present during the preparation of the alkali metal dispersion. As a rule an amount of 0.005 to 5 percent by weight (based on the organic solvent) of aryl halide is used. When larger amounts of aryl halide than this are added, too vigorous a reaction and the formation of undesired byproducts are to be expected. It is preferred to use the aryl halide in an amount of 0.05 to 1 percent by weight, based on the organic solvent.

When mixtures of a triaryl phosphine and an aryl halide are chosen for the preparation of the dispersion, the total amounts used are 5 percent as a maximum and preferably from 0.05 to 1.0 percent by weight based on the organic solvent.

During the dispersion of the liquid alkali metal, for example of sodium at a temperature of about 100°C, in the presence of the said additives, a dispersion according to the invention is formed which makes possible a safe and controlled reaction of an aryl halide with phosphorus trichloride to a triaryl phosphine at a temperature within the range of from 30° to 85°C.

The stoichiometric ratio required for the reaction is 6 gram atoms of alkali metal per mole of phosphorus trichloride. It is recommended that at least this stoichiometric amount of alkali metal should be used.

Advantageously however a somewhat larger amount than the stoichiometric ratio is used, namely an excess of from 0.01 to 8.0 percent by weight of alkali metal.

The reaction is carried out in the presence of an organic solvent. For example saturated aliphatic, cycloaliphatic or aromatic hydrocarbons such as hexane, octane, cyclohexane, benzene, toluene or petroleum fractions which boil within the range of from 70° to 140°C (ligroin) are suitable. Other suitable solvents are ethers such as diethyl ether, dibutyl ether, anisol and tetrahydrofuran. Mixtures of the said solvents may also be used. Toluene has proved to be particularly suitable from among these solvents.

The organic solvent is generally used in an amount which is from 1.5 to 5 times the weight, particularly twice to 3 times the weight, of the starting materials required according to the stoichiometric ratio for the reaction.

The reaction is generally carried out at a temperature of from 20° to 100°C, preferably from 30° to 85°C. At low temperatures the speed of reaction is too low and at high temperatures secondary reactions take place to an increasing extent.

Atmospheric pressure is generally used but the reaction may be carried out at superatmospheric or subatmospheric pressure. The heat of reaction may be removed by evaporative cooling or by indirect cooling.

When the reaction is carried out batchwise, the alkali metal dispersion according to this invention may for example be prepared in the actual reaction vessel, then cooled to about the reaction temperature and the two reactants (triaryl halide and phosphorus trichloride) added. The desired reaction temperature is maintained by adequate cooling.

In continuous operation, the alkali metal dispersion is supplied to the reaction vessel together with the starting materials, the reaction temperature being maintained. A stirred container may generally be used as the reaction vessel and the mean residence time can be varied within wide limits; it is generally from then to 500 minutes, but preferably from 90 to 100 minutes.

The reaction mixture is processed by a conventional method. The alkali metal halide formed and any residual alkali metal are filtered off and if necessary washed with solvent, and the reaction solution is distilled. The triaryl phosphine remaining after the solvent has been distilled off can be immediately used for many purposes without further purification. It is practically free from malodorous contaminants and without recrystallization has a purity of at least 99 percent. The yield is more than 90 percent of the theory based on phosphorus trichloride used.

Aryl phosphines are used to a great extent in preparative organic chemistry for Wittig reactions. On an industrial scale the Wittig reaction is used for example for the production of intermediates in the vitamin A series.

The process according to the invention, carried out continuously and batchwise, is illustrated in greater detail in the following Examples.

EXAMPLE 1

Triphenyl phosphine

Two hundred and five kg of sodium, 1,400 liters of toluene and 1.5 kag of triphenyl phosphine are heated to 100°C in a stirred vessel having a capacity of 4000 liters, the molten sodium being finely dispersed by the stirring. The sodium dispersion which is important for a satisfactory course of the reaction is thus formed. After the dispersion has been cooled to the reaction temperature of 50°C, a mixture of 200 kg of phosphorus trichloride and 490 kg of chlorobenzene is supplied to the reaction vessel at a slowly increasing rate in the course of 2 to 3 hours, the reaction temperature being kept at about 50°C by efficient cooling. The reaction mixture is then left for another hour to 2 hours at temperatures within the range of from 50°C — if necessary with cooling. The reaction mixture is then filtered, the sodium chloride filter cake formed is washed several times with toluene and the united filtrates are evaporated.

Three hundred and forty-five kg of triphenyl phosphine is obtained which has a melting point of 81°C and which has a purity of 99.2 percent. The yield is 91 percent of the theory based on phosphorus trichloride used.

EXAMPLE 2

Tris-(4-methoxyphenyl) phosphine

One thousand one hundred and fifty liters of a dispersion of sodium in toluene and 1,000 liters of a solution which contains 207 kg of phosphorus trichloride and 642 kg of p-chloroanisol are introduced continuously during each hour into a stirred vessel having a capacity of 2,000 liters while stirring intensely. The said sodium dispersion is prepared by finely dispersing 220 kg of sodium per hour in 930 liters of toluene containing 0.1 to 0.5 percent of tris-(4-methoxyphenyl) phosphine in a dispersion vessel at 105°C and is introduced into the said reaction vessel through an overflow. The reaction temperature is kept at 50° to 55°C by efficient cooling. The reaction mixture flows through another overflow into another reaction vessel in which the reaction is completed. After leaving the second reaction vessel, the reaction mixture is cooled and freed by filtration from the sodium chloride formed. The solvent is removed from the filtrate thus obtained by evaporation. 478 kg per hour of tris-(4-methoxyphenyl) phosphine is obtained having a melting point of 129°C. This is equivalent to 91 percent of the theory.

We claim:

1. A process for the production of a triaryl phosphine which comprises reacting an aryl halide with a phosphorus trihalide in the presence of an alkali metal dispersed in an organic solvent at a temperature within the range of from 20° to 100°C, said alkali metal dispersion having been prepared prior to the reaction by dispersing the alkali metal in the molten condition in the organic solvent in the presence of at least one of the components (A) from 0.005 to 10 percent by weight, based on the organic solvent, of the triaryl phosphine whose aryl radicals are identical with those of the aryl halide used for the reaction and (B) from 0.005 to 5 percent by weight, based on the organic solvent, of the aryl halide used for the reaction.

2. A process as claimed in claim 1 wherein the production of the alkali metal dispersion is carried out in the presence of from 0.05 to 1 percent by weight, based on the organic solvent, of triaryl phosphine and/or 0.05 to 1 percent by weight, based on the organic solvent, of aryl halide.

3. A process as claimed in claim 1 wherein toluene is used as the organic solvent for the preparation of the alkali metal dispersion.

4. A process as claimed in claim 1 wherein the aryl halide used is an aryl chloride.

5. A process as claimed in claim 1 wherein the aryl halide is a halide of the benzene or naphthalene series.

6. A process as claimed in claim 1 wherein phosphorus trichloride is used as the phosphorus halide.

7. A process as claimed in claim 1 wherein the amount of alkali metal used is an excess of from 0.01 to 8.0 percent by weight over the stoichiometric amount.

8. A process as claimed in claim 1 wherein the organic solvent is used in an excess which is from 1.5 to 5 times the weight of starting materials required according to the stoichiometric ratio for the reaction.

9. A process as claimed in claim 8 wherein the said excess is from twice to three times the weight of starting materials required according to the stoichiometric ratio for the reaction.

10. A process as claimed in claim 1 carried out at from 30° to 85°C.

* * * * *